(12) United States Patent
Heintz et al.

(10) Patent No.: US 8,726,570 B1
(45) Date of Patent: May 20, 2014

(54) FLOWERPOT DOILY-SUPPORTING ACCESSORY

(76) Inventors: Andrew D. Heintz, Harrison, MI (US); Sharon K. Heintz, Harrison, MI (US)

( * ) Notice: Subject to any disclaimer, the term of this patent is extended or adjusted under 35 U.S.C. 154(b) by 325 days.

(21) Appl. No.: 13/154,492

(22) Filed: Jun. 7, 2011

(51) Int. Cl.
*A01G 9/02* (2006.01)

(52) U.S. Cl.
CPC .................................. *A01G 9/02* (2013.01)
USPC ............................................. 47/72; 47/66.6

(58) Field of Classification Search
USPC ............. 47/29.5, 31, 31.1, 65.5, 66.6, 70, 72; 40/645, 668; 248/127; 57/44, 45, 57/41.01, 41.14
See application file for complete search history.

(56) References Cited

U.S. PATENT DOCUMENTS

| | | | | |
|---|---|---|---|---|
| 87,313 A * | 2/1869 | Wickes | | 47/31 |
| 2,048,906 A * | 7/1936 | Webster | | 40/645 |
| 2,145,531 A * | 1/1939 | Shuko | | 24/6 |
| 2,147,562 A * | 2/1939 | Thomas | | 40/603 |
| 2,253,172 A * | 8/1941 | Fetterman | | 108/158.11 |
| 2,269,087 A * | 1/1942 | Schramm | | 40/669 |
| 2,857,695 A * | 10/1958 | Goetting | | 40/645 |
| 3,013,801 A * | 12/1961 | Kirkconnell, Jr. | | 473/197 |
| 3,651,601 A * | 3/1972 | La Montagne | | 47/41.12 |
| 4,116,446 A * | 9/1978 | Thompson | | 473/197 |
| 4,300,312 A | 11/1981 | Weder et al. | | |
| 4,395,844 A * | 8/1983 | Jopson | | 47/31 |
| 4,407,507 A * | 10/1983 | Caruso et al. | | 273/400 |
| 5,405,116 A | 4/1995 | Shepherd et al. | | |
| D368,237 S | 3/1996 | Shryock | | |
| 5,735,075 A * | 4/1998 | Honkawa et al. | | 47/41.12 |
| 6,138,409 A | 10/2000 | Weder | | |
| 6,471,166 B1 * | 10/2002 | Toettcher | | 248/175 |
| 7,275,341 B1 * | 10/2007 | Kincaid | | 40/645 |
| 2005/0039389 A1 | 2/2005 | Partikian | | |
| 2007/0199240 A1 * | 8/2007 | Koessler | | 47/31.1 |
| 2008/0190021 A1 | 8/2008 | Marks | | |

* cited by examiner

*Primary Examiner* — Son T Nguyen
*Assistant Examiner* — Kathleen Alker

(57) ABSTRACT

The flowerpot doily-supporting accessory includes a cross brace and a plurality of leg supports that extend downwardly therefrom. The cross brace is a curved bar that enables a doily to be draped thereon in order to form an assembly. The leg supports include at least one leg located on opposing sides of the cross brace which extend downwardly and include a pointed in for insertion into potting soil or a pumpkin. The assembly is adorned along a front surface of the flowerpot in order to provide a decoration thereon, and may alternatively be employed along a front surface of a pumpkin.

3 Claims, 6 Drawing Sheets

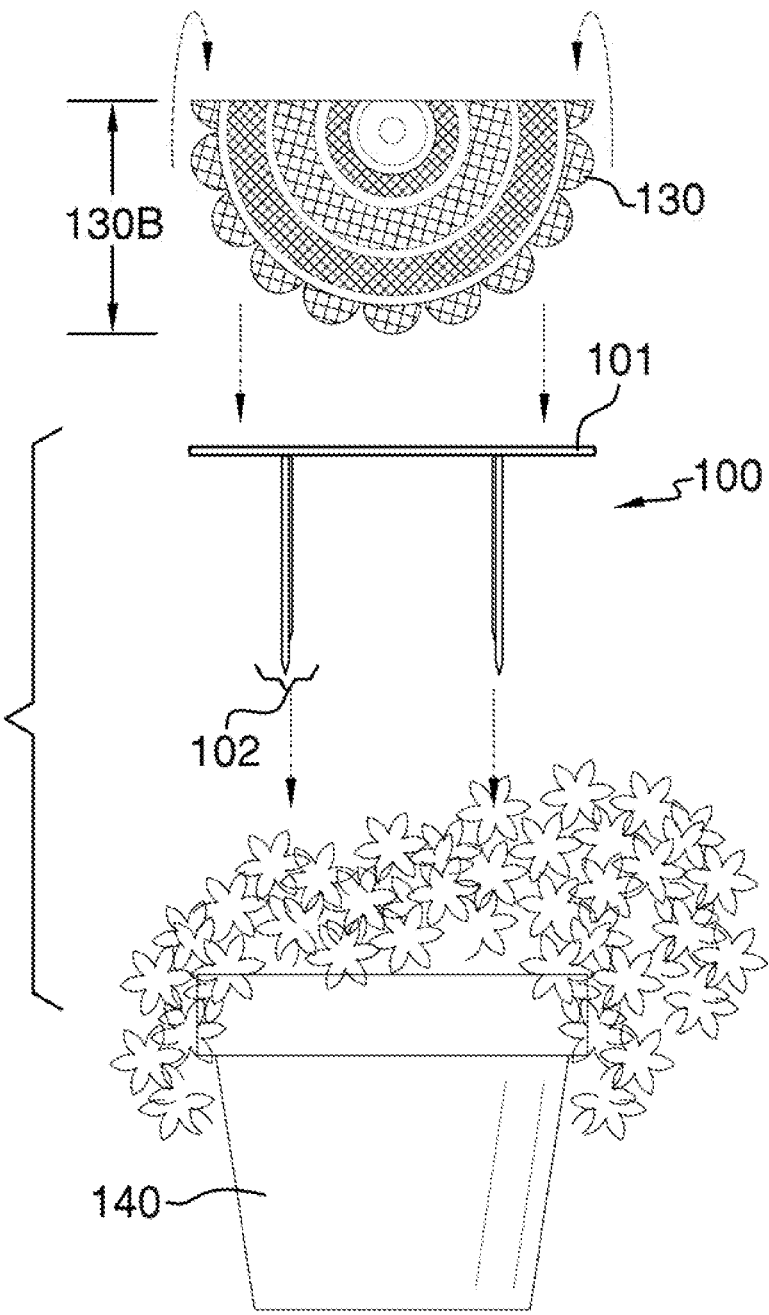

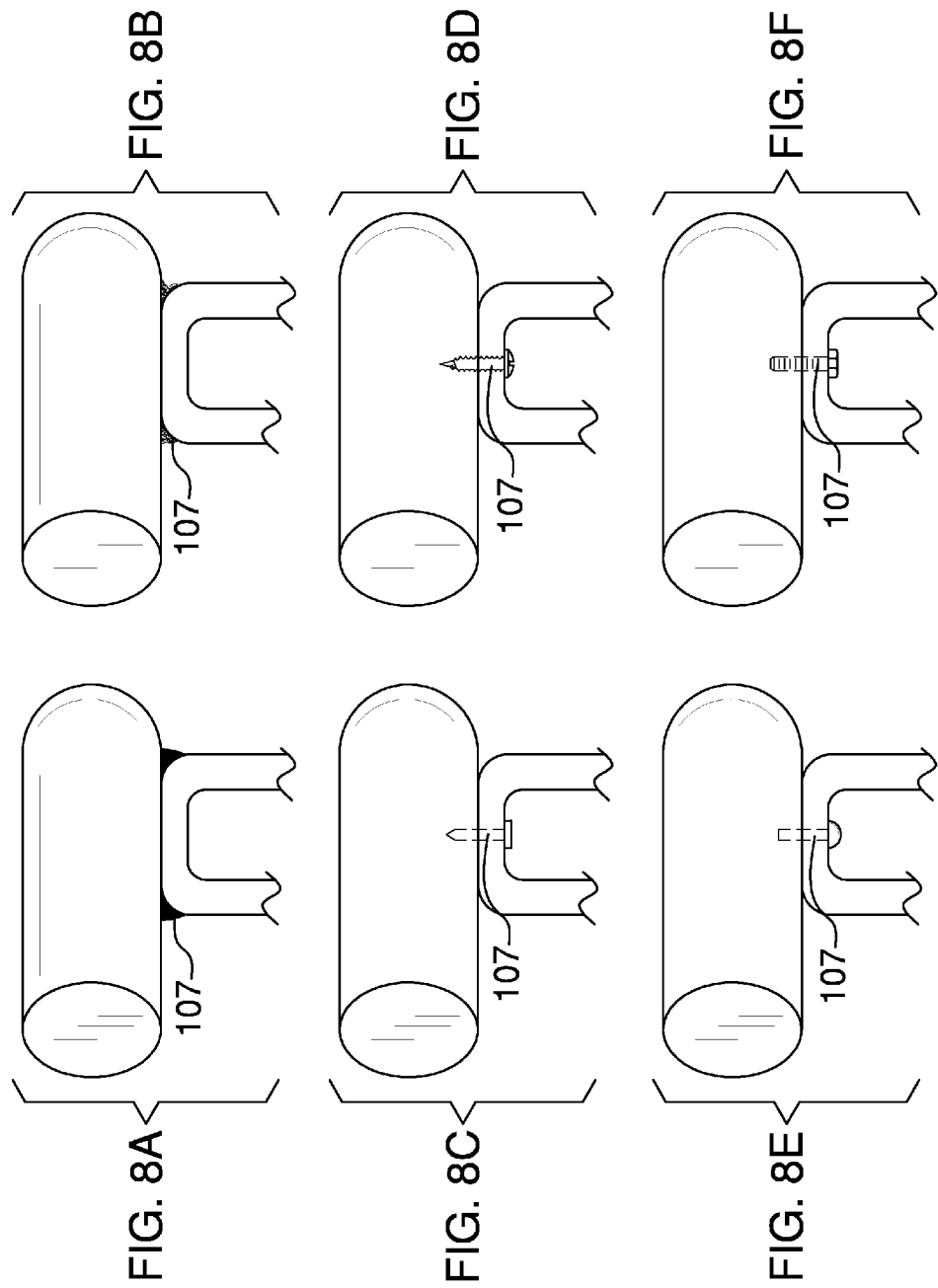

FLOWERPOT DOILY-SUPPORTING ACCESSORY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of flowerpots, more specifically, a supporting accessory for a doily that decorates the front of a flowerpot.

B. Discussion of the Prior Art

As will be discussed immediately below, no prior art discloses a flowerpot doily-supporting accessory composed of a cross brace from which leg supports extend downwardly; wherein the leg supports each have at least one leg containing a point end, which is inserted into potting soil along a front side of a flowerpot; wherein the cross brace is composed of a curved bar that traverses the leg supports and provides a place upon which a doily may be draped over prior to securement to a front of said flowerpot; wherein said assembly being composed of both the doily and the supporting accessory; wherein the doily-supporting ensure that said doily is fully exhibited and free of folds or wrinkles thereon.

The Partikian Patent Application Publication (U.S. Pub. No. 2005/0039389) discloses a cover/entrapment system for a plant/flower pot. However, the cover/entrapment system is not a decorative assembly for use along a front of a flowerpot or pumpkin in order to further decorate said object by the use of a doily.

The Marks Patent Application Publication (U.S. Pub. No. 2008/0190021) discloses a decorative plant pot holder including a substantially waterproof plant pot sleeve and a decorative plant pot fabric covering. However, the decorative plant pot holder is directed to providing a waterproofing feature, and not displaying a doily along a front surface of a flowerpot or pumpkin in a decorative manner.

The Weder patent (U.S. Pat. No. 6,138,409) discloses a method for providing a cover for a flower pot. However, the method does not involve or use a doily along a front surface of a flowerpot in a decorative capacity.

The Weder patent (U.S. Pat. No. 4,300,312) discloses a substantially planar sheet of thin plastic film held about the exterior of a flower pot by use of a cradle, wherein the thin plastic film sheath can have a design of various colors or a doily effect imprinted thereon to enhance the visual effect. Again, the method does not involve or use a doily along a front surface of a flowerpot in a decorative capacity.

The Shepherd et al. patent (U.S. Pat. No. 5,405,116) discloses an adjustable mounting bracket for mounting a flower pot on a wall comprising a mounting plate and a leg supported by the mounting plate for supporting the flower pot. However, the bracket is not capable of supporting a doily along a front surface of a flowerpot or pumpkin in an unwrinkled capacity.

The Shryock patent (U.S. Pat. No. Des. 368,237) illustrates an ornamental design for a flower pot cover with fins, which does not depict a doily being supported on an accessory.

While the above-described devices fulfill their respective and particular objects and requirements, they do not describe a flowerpot doily-supporting accessory composed of a cross brace from which leg supports extend downwardly; wherein the leg supports each have at least one leg containing a point end, which is inserted into potting soil along a front side of a flowerpot; wherein the cross brace is composed of a curved bar that traverses the leg supports and provides a place upon which a doily may be draped over prior to securement to a front of said flowerpot; wherein said assembly being composed of both the doily and the supporting accessory wherein the doily-supporting accessory weaves the leg supports through the doily in order to ensure that said doily is fully exhibited and free of folds or wrinkles thereon. In this regard, the flowerpot doily-supporting accessory departs from the conventional concepts and designs of the prior art.

SUMMARY OF THE INVENTION

The flowerpot doily-supporting accessory includes a cross brace and a plurality of leg supports that extend downwardly therefrom. The cross brace is a curved bar that enables a doily to be draped thereon in order to form an assembly. The leg supports include at least one leg located on opposing sides of the cross brace which extend downwardly and include a pointed in for insertion into potting soil or a pumpkin. The assembly is adorned along a front surface of the flowerpot in order to provide a decoration thereon, and may alternatively be employed along a front surface of a pumpkin.

An object of the invention is to provide a doily-supporting accessory that can be used along a front surface of either a flowerpot or pumpkin in order to decorate the front of the flowerpot or pumpkin with a doily.

A further object of the invention is to provide a doily-supporting accessory that includes a cross brace that is composed of a curved bar ideally suited for draping a doily thereon.

A further object of the invention is to provide a doily-supporting accessory that includes a plurality of leg supports that extend downwardly into potting soil or into the flesh of the pumpkin.

An even further object of the invention is to weave the doily through the leg supports in order to ensure said doily is fully exhibited and free of folds or wrinkles thereon and is also secured to said accessory.

These together with additional objects, features and advantages of the flowerpot doily-supporting accessory will be readily apparent to those of ordinary skill in the art upon reading the following detailed description of presently preferred, but nonetheless illustrative, embodiments of the flowerpot doily-supporting accessory when taken in conjunction with the accompanying drawings.

In this respect, before explaining the current embodiments of the flowerpot doily-supporting accessory in detail, it is to be understood that the flowerpot doily-supporting accessory is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the flowerpot doily-supporting accessory.

It is therefore important that the claims be regarded as including such equivalent construction insofar as they do not depart from the spirit and scope of the flowerpot doily-supporting accessory. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 6 illustrates an exploded view of the flowerpot doily-supporting accessory aligned above a flowerpot, and a doily being folded over in anticipation of being suited upon the cross bar;

FIGS. 8A-8F illustrate the various fastening means used and depict welds, glue, rivets, screws, nails, and bolts.

DETAILED DESCRIPTION OF THE EMBODIMENT

Figure 1:
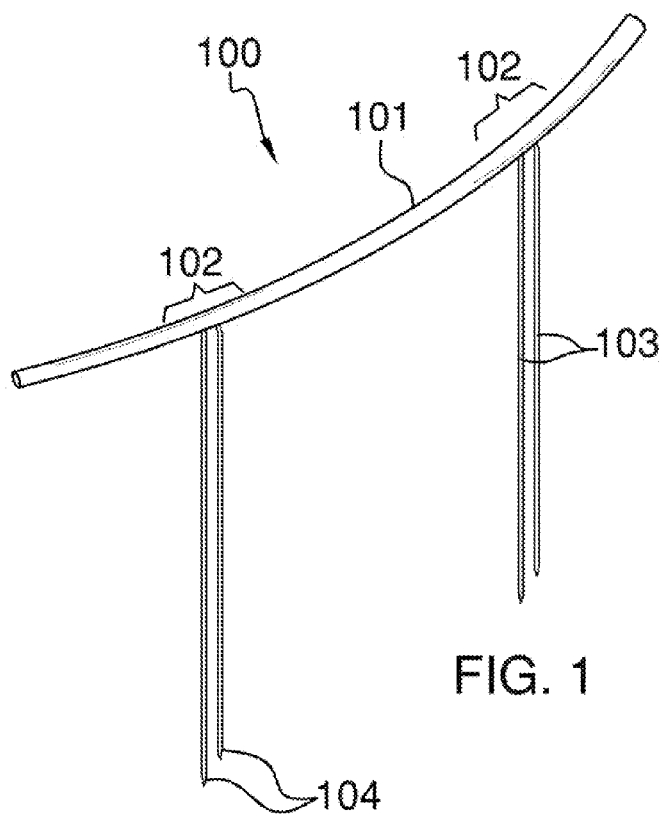
FIG. 1 illustrates an isometric view of the flowerpot doily-supporting accessory by itself.
Figure 2:
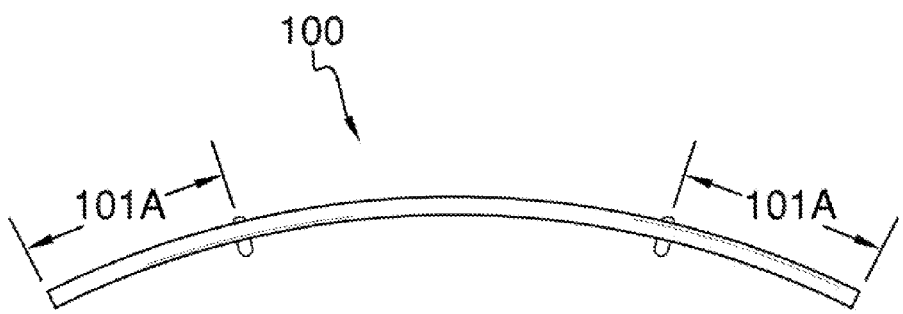
FIG. 2 illustrates a top view of the flowerpot doily-supporting accessory by itself.
Figure 3:
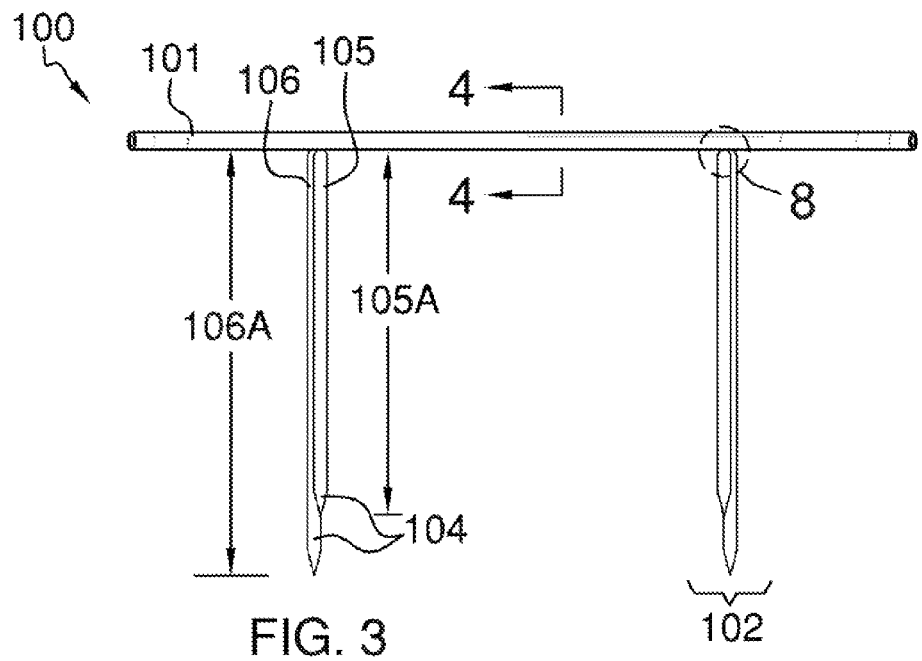
FIG. 3 illustrates a rear view of the flowerpot doily-supporting accessory by itself.
Figure 4:
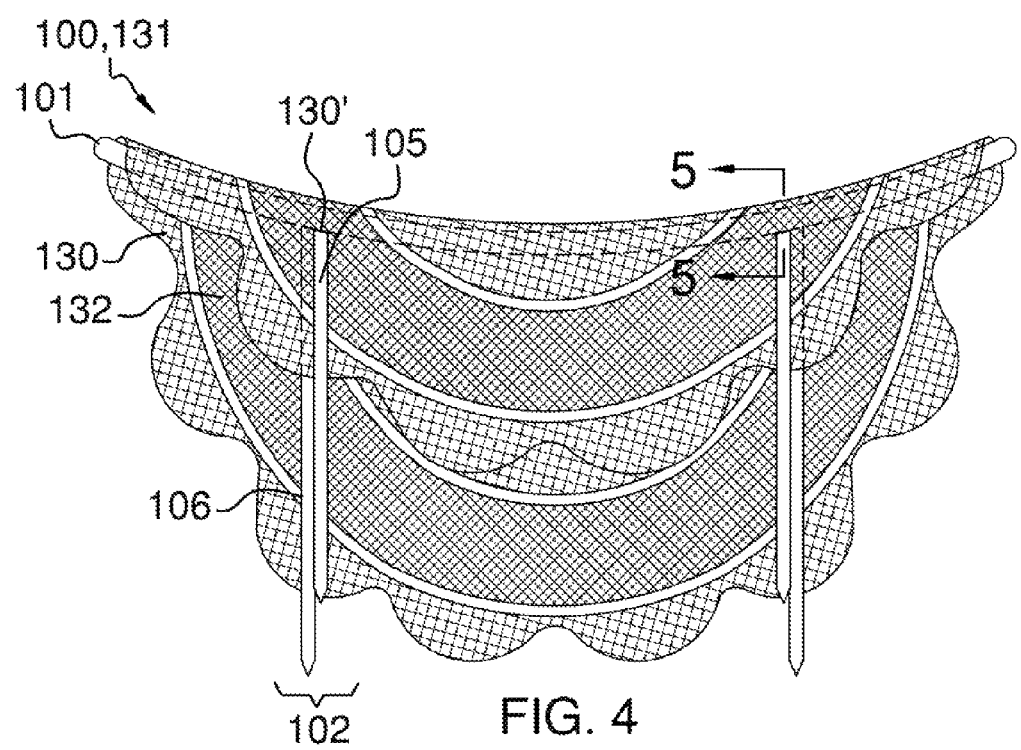
FIG. 4 illustrates a rear, perspective view of the flowerpot doily-supporting accessory with a doily installed thereon, and detailing the weaving of the leg supports through said doily.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-8. A flowerpot doily-supporting accessory 100 (hereinafter invention) includes a cross brace 101 and a plurality of leg supports 102. The cross brace 101 is composed of a curved bar that spans across the leg supports 102 (see FIG. 2). The leg supports 102 extend downwardly from the cross brace 101. The leg supports 102 are further defined by at least one leg 103 that includes a pointed end 104.

The leg supports 102 ideally include a first leg 105 and a second leg 106. The first leg 105 has a length 105A that is less than a length 106A of the second leg 106. The leg supports 102 are each secured on opposing sides of the cross brace 101. More specifically, the leg supports 102 attach to the cross brace 101 at a distance 101A from each end of the cross brace 101.

The cross brace 101 and the leg supports 102 are made of a material comprising a plastic, wood, carbon fiber composite, or metal. The leg supports 102 secure to the cross brace 101 via fastening means 107 comprising welding, gluing, nailing, riveting, bolting, or screwing.

A doily 130 is secured to the invention 100 to form an assembly 131. The doily 130 is composed of a lattice of pattern 132 that is used to secure the doily 130 to the invention 100. The doily 130 is draped atop the cross brace 101. More particularly, the second legs 106 of the leg supports 102 protrude through the doily 130 through a hole 130' that is associated with the pattern 132 of the doily 130, and such that a first portion 130A of the doily 130 is situated between the first leg 105 and the second leg 106.

Figure 7A:
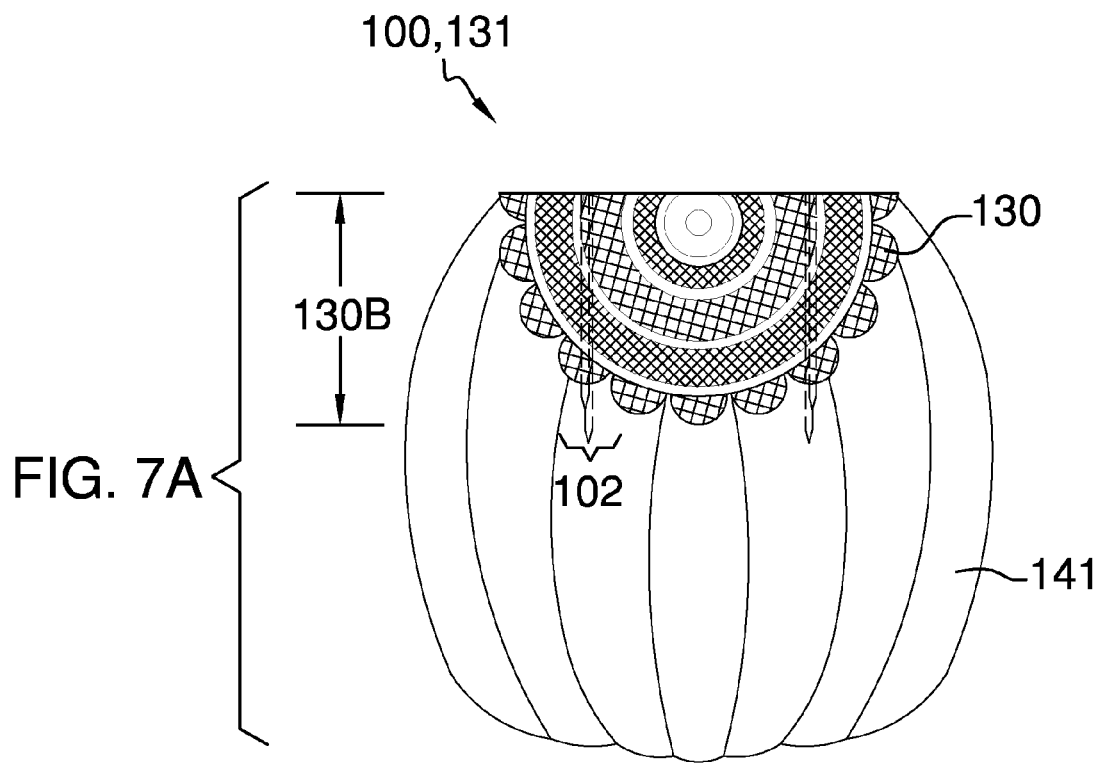
FIGS. 7A and 7B illustrate the doily-supporting accessory with doily installed thereon in use with a flowerpot and in use with a pumpkin.
Figure 7B:
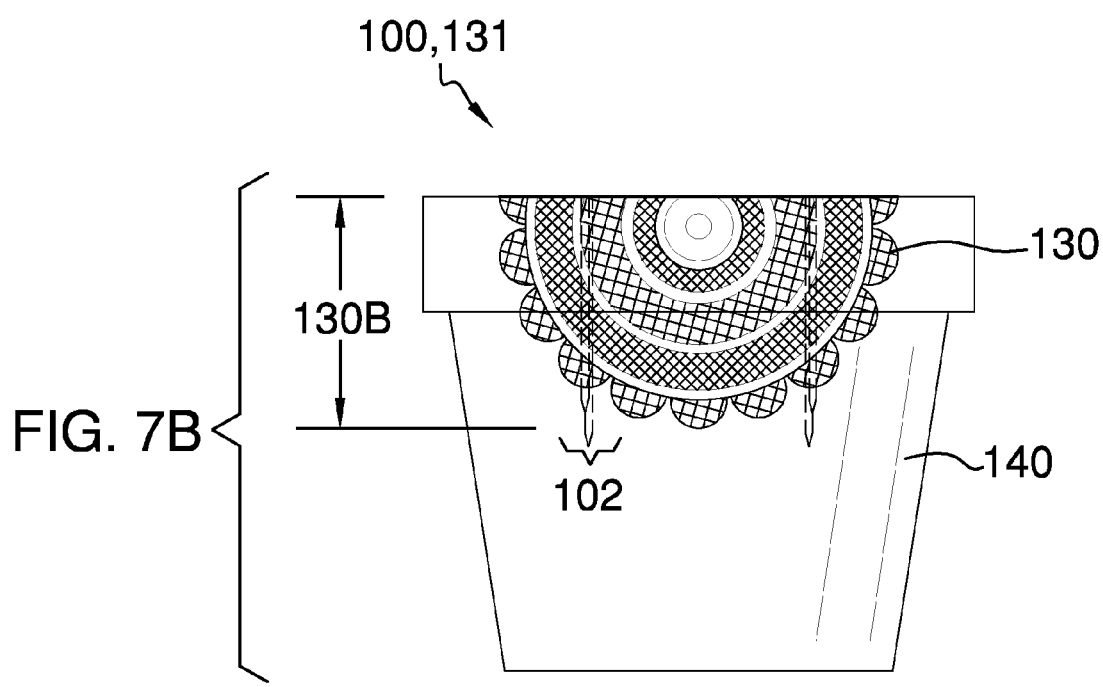

A second portion 130B of the doily 130 is draped across a front surface of the cross brace 101. The second portion 130B will be highly visible when the assembly 131 is installed on a flowerpot 140 or pumpkin 141, as depicted in FIGS. 6-7. More importantly, the second portion 130B is stretched across the entire length of the cross brace 101 in an unwrinkled and smooth condition. Even more importantly, the second portion 130B of the doily 130 is curved along the curvature of the cross brace 101, which accommodates a curvature along a front surface of the flowerpot 140 or the pumpkin 141.

It shall be noted that the term doily 130 is being used to describe a small ornamental mat, usually of lace or lined, and which is decorative in nature. Doilies are traditionally used with dishes, bowls, or even as decorative materials associated with furniture.

Figure 5:
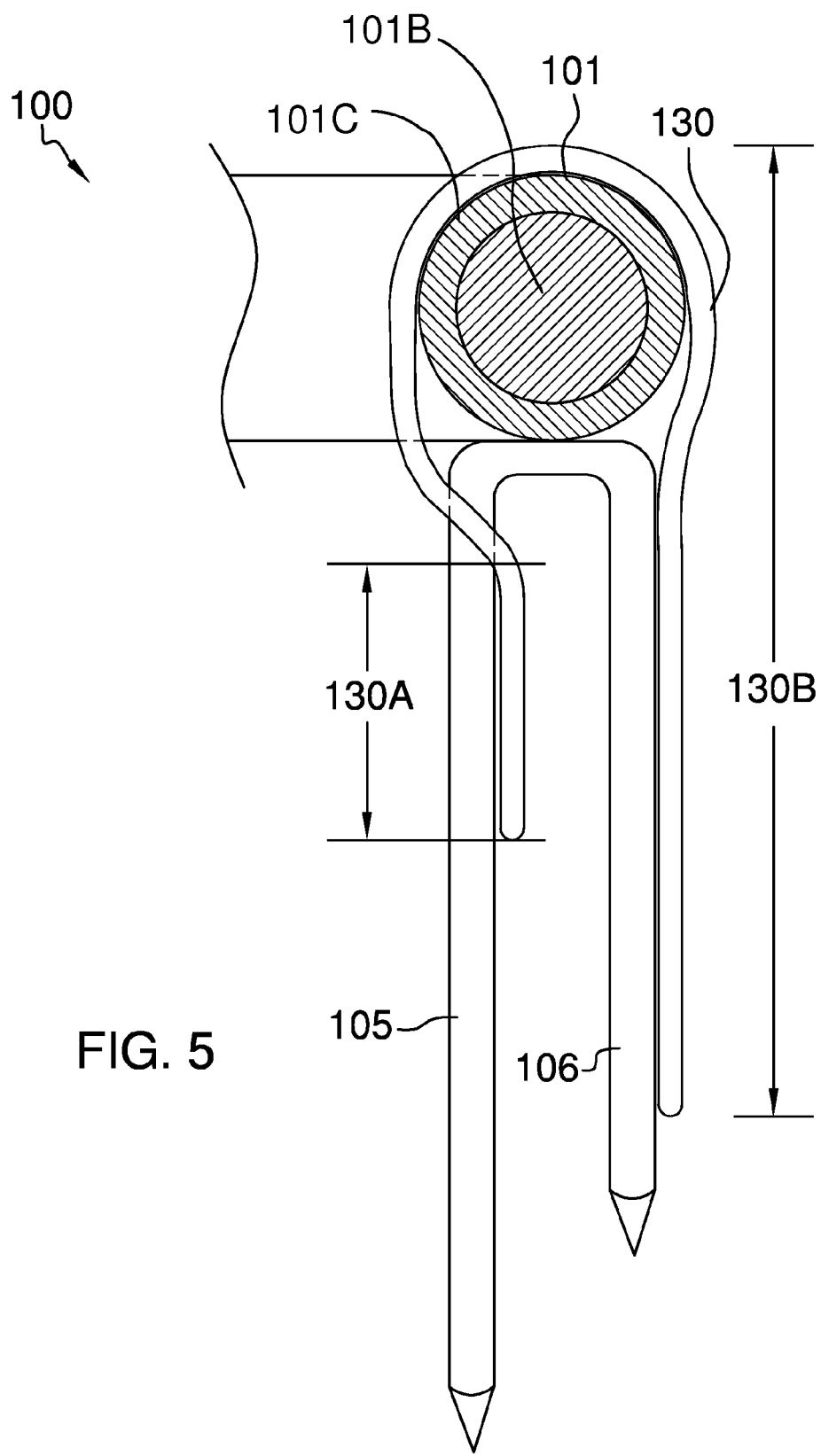
FIG. 5 illustrates a cross-sectional view of the flowerpot doily-supporting accessory along line 5-5 in FIG. 4, and depicting the bar enclosed by the rubber cover.

The leg supports 102, and weaving the doily 130 there between, as depicted by FIG. 5, secures the doily 130 in place with the invention 100, and also ensures that the second portion 130B is unwrinkled and smooth.

Referring to FIG. 5, it shall be noted that the cross brace 101 includes an inner layer 101B and an outer layer 101C. The inner layer 101B is composed of the materials described above; whereas the outer layer 101C is made of a material that is colored white so as to match the color of the doily 130.

It shall be noted that the invention 100 and subsequent assembly 131 is being used as a decorative element for the flowerpot 140 or pumpkin 141 as illustrated and described above.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A flowerpot doily-supporting accessory comprising:
   a cross brace from which a plurality of leg supports extend downwardly;

wherein a doily is stretched across said cross-brace, said cross-brace is adaptively secured into potting soil of a flowerpot or inserted into the flesh of a pumpkin;

wherein the accessory is adaptively installed along a front surface of the flowerpot as a decoration;

wherein the cross brace is a curved bar that spans across the leg supports;

wherein the pair of leg supports are each further defined as including a first leg and a second leg that are each provided a pointed end configured to be inserted into said potting soil; wherein the first leg has a length that is less than a length of the second leg;

wherein the leg supports are each secured on opposing sides of the cross brace;

wherein the leg supports attach to the cross brace at a distance from each end of the cross brace;

wherein the doily is composed of a pattern, which is used to drape the doily atop the cross brace;

wherein the second legs of the pair of leg supports protrude through the doily through a hole associated with the pattern, and such that a first portion of the doily is situated between the first leg and the second leg of each leg support; wherein a second portion of the doily is draped across a front surface of the cross brace; wherein the second portion is visible when the accessory is installed on the flowerpot or a pumpkin.

2. The flowerpot doily-supporting accessory as described in claim 1 wherein the cross brace and the leg supports are made of a material comprising a plastic, wood, carbon fiber composite, or metal; wherein the leg supports secure to the cross brace via fastening means comprising welding, gluing, nailing, riveting, bolting, or screwing.

3. The flowerpot doily-supporting accessory as described in claim 1 wherein the second portion is stretched across the entire length of the cross brace; wherein the second portion of the doily is curved along the curvature of the cross brace.

* * * * *